United States Patent
Gao et al.

(10) Patent No.: US 9,103,928 B2
(45) Date of Patent: Aug. 11, 2015

(54) METHODS AND SYSTEMS FOR ANALYZING FORMATION PROPERTIES WHEN PERFORMING SUBTERRANEAN OPERATIONS

(75) Inventors: Li Gao, Katy, TX (US); Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/126,726

(22) PCT Filed: Nov. 18, 2011

(86) PCT No.: PCT/US2011/061330
§ 371 (c)(1),
(2), (4) Date: Dec. 16, 2013

(87) PCT Pub. No.: WO2013/074112
PCT Pub. Date: May 23, 2013

(65) Prior Publication Data
US 2014/0111209 A1    Apr. 24, 2014

(51) Int. Cl.
G01V 3/00 (2006.01)
G01V 3/12 (2006.01)
G01V 3/26 (2006.01)

(52) U.S. Cl.
CPC ... *G01V 3/12* (2013.01); *G01V 3/26* (2013.01)

(58) Field of Classification Search
CPC ............ G01V 3/12; G01V 3/20; G01V 3/26; G01V 3/38
See application file for complete search history.

(56) References Cited

U.S. PATENT DOCUMENTS

| 5,200,705 | A | * | 4/1993 | Clark et al. | 324/338 |
|---|---|---|---|---|---|
| 6,225,806 | B1 | * | 5/2001 | Millar et al. | 324/353 |
| 6,470,275 | B1 | | 10/2002 | Dubinsky | |
| 6,747,915 | B2 | | 6/2004 | Calvert | |
| 7,653,137 | B2 | | 1/2010 | Fink et al. | |
| 2009/0309805 | A1 | | 12/2009 | Fink et al. | |

FOREIGN PATENT DOCUMENTS

| WO | 03/023450 A1 | 3/2003 |
|---|---|---|
| WO | 2011/136760 A1 | 11/2011 |

OTHER PUBLICATIONS

International Search Report and Written Opinion, International Application No. PCT/US2011/061330, 12 pgs., Jul. 25, 2012.
International Preliminary Report on Patentability issued in related International Application No. PCT/US2011/061330 mailed Oct. 29, 2012, 19 pages.
"Time reversal of electromagnetic waves", G. Lerosey et al, Phys. Rev. Lett., vol. 92, No. 19, at p. 193904-1, (2004).
"Time reversal in lossy material: an assessment", I. Scott et al, PIERS, vol. 3, No. 8 (2007), at p. 1259.

\* cited by examiner

*Primary Examiner* — Minh N Tang
(74) *Attorney, Agent, or Firm* — Alan Bryson; Baker Botts L.L.P.

(57) ABSTRACT

A method of analyzing a subterranean formation is disclosed. A first signal is transmitted from a transmitter to the formation and a second signal which is a reflection of the first signal is received. A third signal, which is the second signal reversed in time, is then transmitted to the formation. A fourth signal which is a reflection of the third signal from the formation is then received and monitored.

20 Claims, 11 Drawing Sheets

METHODS AND SYSTEMS FOR ANALYZING FORMATION PROPERTIES WHEN PERFORMING SUBTERRANEAN OPERATIONS

CROSS-REFERENCE TO RELATED APPLICATION

This application is a U.S. National Stage Application of International Application No. PCT/US2011/061330 filed Nov. 18, 2011, and which is hereby incorporated by reference in its entirety.

BACKGROUND

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

Modern oil field operations demand a great quantity of information relating to the parameters and conditions encountered downhole. Such information may include characteristics of the earth formations traversed by the borehole and data relating to the size and configuration of the borehole itself. The collection of information relating to conditions downhole, which commonly is referred to as "logging," can be performed by several methods including wireline logging, measurement-while-drilling (MWD), logging-while-drilling (LWD), drillpipe conveyed logging, and coil tubing conveyed logging. A variety of logging tools are available for use with each of these methods.

The basic techniques for electromagnetic logging for earth formations are well known. For instance, induction logging to determine resistivity (or its inverse, conductivity) of earth formations adjacent a borehole is one of the techniques used in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

During drilling operations, it is important to be able to anticipate the properties of formations ahead of the bit. For instance, it is undesirable to drill into a high pressure water zone or other formation zones that can hinder the performance of subterranean operations. Seismic models and other approaches currently utilized for looking ahead of the bit such as traditional electromagnetic methods as proposed, for example, in U.S. Pat. No. 6,856,909 or cross-component induction methods as proposed, for example, in US2005/0098487 have a number of disadvantages. For instance, the long wave length of a seismic wave limits its resolution. The same is true for the electromagnetic method. Furthermore, the electromagnetic method requires a prior knowledge of formation resistivity which may not be available during the drilling process.

Figure 1:
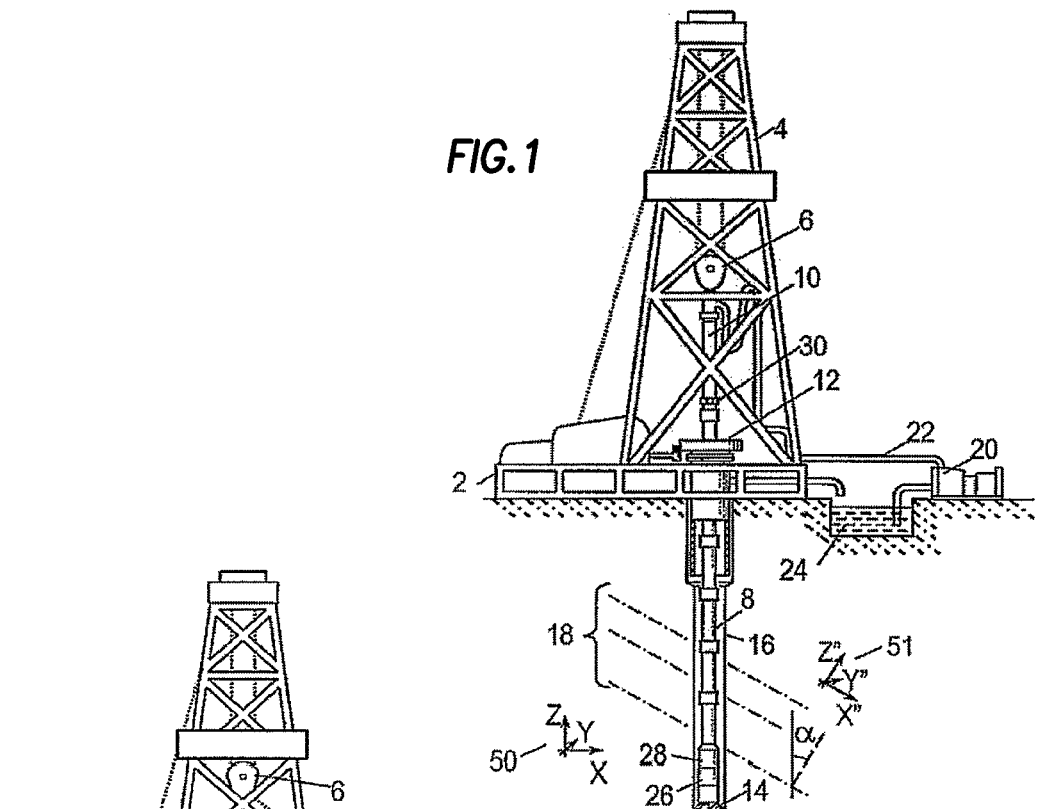
FIG. 1 shows an illustrative logging while drilling environment.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD and LWD operations.

The terms "couple" or "couples" as used herein are intended to mean either an indirect or direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present application is directed to improving efficiency of subterranean operations and more specifically, to a method and system for looking ahead of a bit when performing drilling operations.

Turning now to FIG. 1, oil well drilling equipment used in an illustrative LWD environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A logging tool 26 may be integrated into the bottom-hole assembly near the bit 14. The logging tool 26 may include receivers and transmitters. In one embodiments, the logging tool 26 may include a transceiver array that functions as both a transmitter and a receiver. As the bit extends the borehole through the formations, logging tool 26 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

Figure 2:
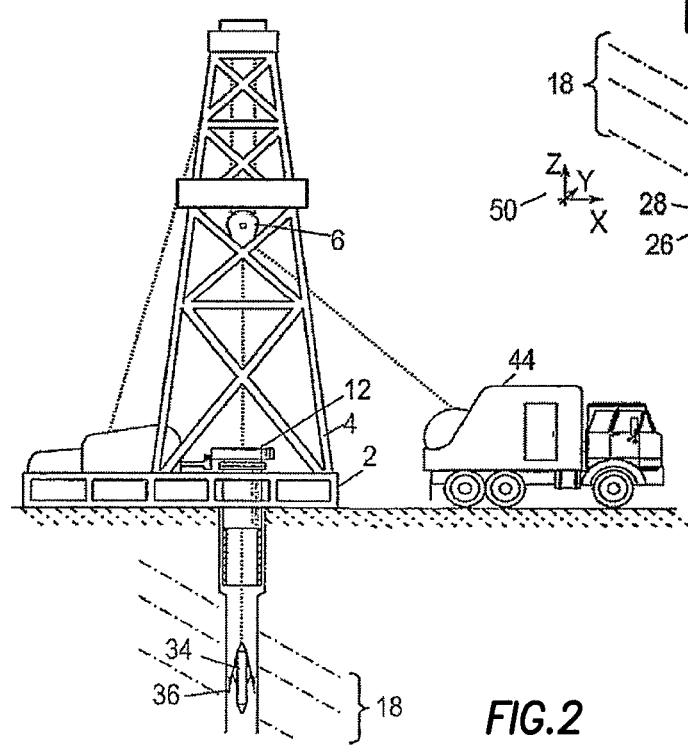
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable having conductors for transporting power to the tool and telemetry from the tool to the surface. A logging facility 44 may collect measurements from the logging tool 34, and may include computing facilities for processing and storing the measurements gathered by the logging tool.

As would be appreciated by those of ordinary skill in the art, with the benefit of this disclosure, an electromagnetic wave propagating in a medium with permittivity $\epsilon(r)$ and magnetic permeability $\mu(r)$ may be expressed by the following wave equation:

$$\nabla^2 E(r, t) - \mu(r)\varepsilon(r)\frac{\partial^2}{\partial t^2}E(r, t) = 0$$

This equation is invariant under time reversal operation. Specifically, if $E(r, t)$ is a solution, then $E(r,-t)$ will also be a solution to this equation. The methods and systems disclosed herein take advantage of the time reversal invariance of Eq. (1) as discussed in more detail below.

Figure 3A:
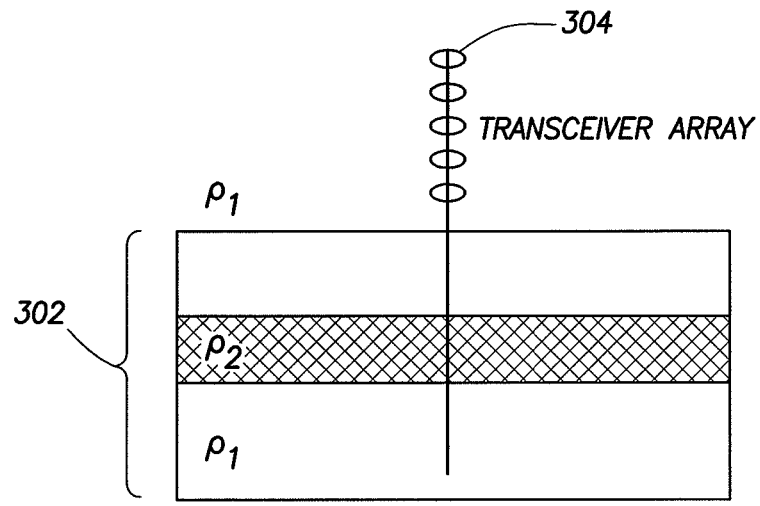
FIGS. 3A and 3B depict schematic views of a formation bed configuration ahead of the bit in accordance with exemplary embodiments of the present invention.
Figure 3B:
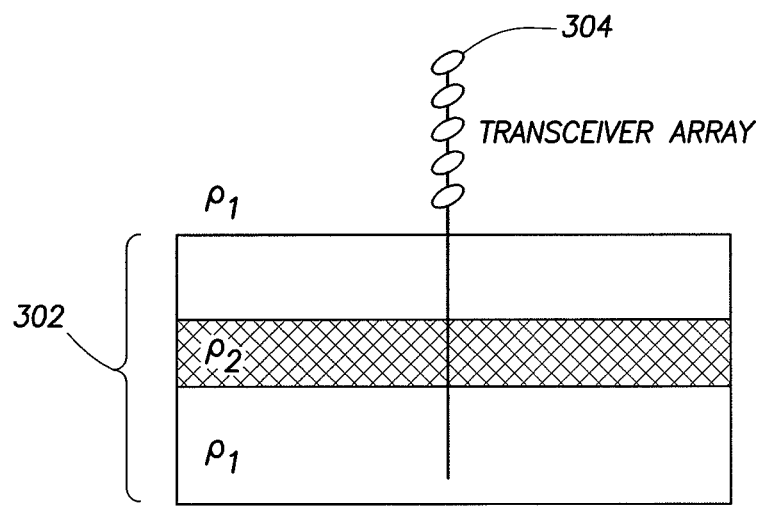

FIGS. 3A and 3B depict a schematic view of a formation bed configuration 302 ahead of the drill bit ("bit"). As would be appreciated by those of ordinary skill in the art, the logging tool 26 transceivers 304 may be replaced by separate transmitters and receivers for transmission and detection of electromagnetic pulse signals. In the exemplary formation of FIG. 3, the formation comprises a first portion having resistivity $\rho_1$ and a second portion having resistivity $\rho_2$. However, as would be appreciated by those of ordinary skill in the art, with the benefit of this disclosure, the methods and systems disclosed herein are not limited to any specific formation configuration.

FIG. 3A depicts horizontal transceivers 304. However, in another exemplary embodiment, the transceivers 304 may be tilted as shown in FIG. 3B. Accordingly, the transceivers used in conjunction with the methods and systems disclosed herein may be coaxial, tilted or horizontal transceivers.

In another exemplary embodiment, the transceiver array may be virtually steered into any desired orientation by adjusting the relative phase between a coaxial and a horizontal transceiver pair as disclosed in U.S. Pat. No. 6,272,706 (hereinafter, "virtually steerable transceiver"). Operation of a virtually steerable transceiver is next discussed in conjunction with FIGS. 4-15.

Figure 4:
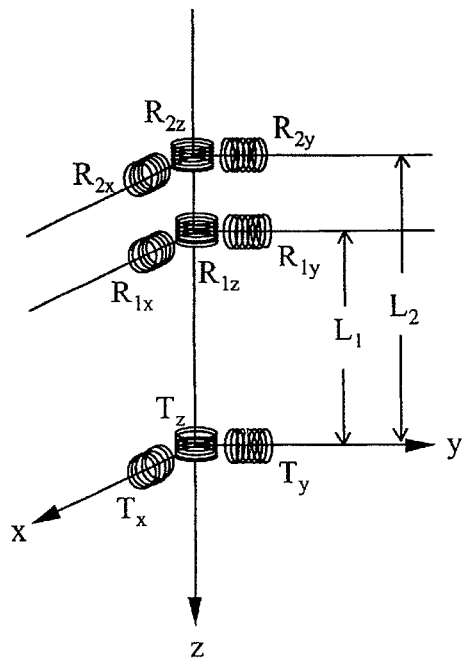
FIG. 4 shows the coil configuration of a triaxial induction tool.

FIG. 4 shows a conceptual sketch of a coil arrangement for a downhole induction tool. A triad of transmitter coils Tx, Ty and Tz, each oriented along a respective axis, is provided. A triad of similarly oriented, balanced, receiver coil pairs (R1x, R2x), (R1y, R2y) and (R1z, R2z) is also provided. The transmitter-receiver spacings L1 and L2, together with the number of turns in each receiver coil, are preferably chosen so as to set the direct coupling between each transmitter and the corresponding combined receiver pairs equal to zero. Hereafter, each of the receiver coil pairs will be treated as a single balanced receiver coil. For clarity, it is assumed that the three coils in each triad represent actual coils oriented in mutually perpendicular directions, with the z-axis corresponding to the long axis of the tool. However, it is noted that this coil arrangement can be "synthesized" by performing a suitable transformation on differently oriented triads.

Figure 5:
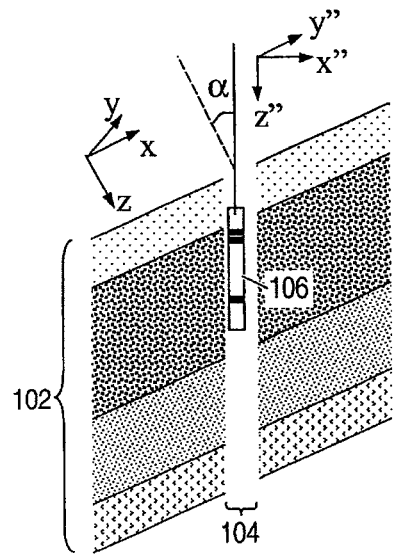
FIG. 5 shows a triaxial induction tool located in a borehole in angled formation beds.
Figure 6:
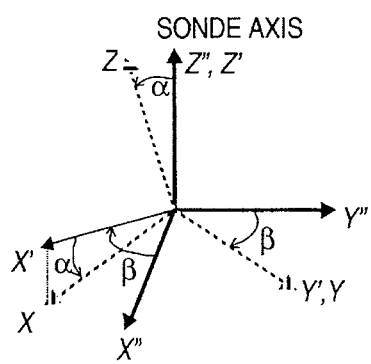
FIG. 6 demonstrates a rotational transformation definition.

FIG. 5 shows a formation having a series of layered beds 102 dipping at an angle. A wellbore 104 passing through the beds 102 is shown containing an induction tool 106. A first (x,y,z) coordinate system is associated with the beds 102, and a second coordinate system (x",y",z") is associated with the induction tool 106. As shown in FIG. 6, the two coordinate systems are related by two rotations. Beginning with the induction tool's coordinate system (x",y",z"), a first rotation of angle β is made about the z" axis. The resulting coordinate system is denoted (x',y', z'). Angle β is the strike angle, which indicates the direction of the formation dip. A second rotation of angle α is then made about the y' axis. This aligns the coordinate system with the beds. Angle α is the dip angle, which is the slope angle of the beds.

Any vector in one of the coordinate systems can be expressed in terms of the other coordinate system by using rotational transform matrices. Thus, if v" is a vector expressed in the (x",y",z") coordinate system, it can be expressed mathematically in the (x,y,z) coordinate system as:

$$v = R_\alpha R_\beta v'' = Rv'' \quad (1)$$

where:

$$R = R_\alpha \cdot R_\beta \quad (2)$$

$$= \begin{bmatrix} \cos\alpha & 0 & -\sin\alpha \\ 0 & 1 & 0 \\ \sin\alpha & 0 & \cos\alpha \end{bmatrix} \begin{bmatrix} \cos\beta & \sin\beta & 0 \\ -\sin\beta & \cos\beta & 0 \\ 0 & 0 & 1 \end{bmatrix}$$

$$= \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix}$$

Consequently, given measurements in the coordinate system of the induction tool, the corresponding measurements in the coordinate system of the beds can be determined if the dip and strike angles are known.

Moran and Gianzero, in "Effects of Formation Anisotropy on Resistivity Logging Measurements" Geophysics, Vol. 44, No. 7, p. 1266 (1979), noted that the magnetic field "h" in the receiver coils can be represented in terms of the magnetic moments "m" at the transmitters and a coupling matrix "C":

$$h = Cm \quad (3)$$

In express form, equation (3) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix} \quad (4)$$

Of course, equation (3) is also valid in the induction tool coordinate system, so:

$$h'' = C''m'' \quad (5)$$

The relationship between the coupling matrices C and C" can be determined from equations (1), (3), and (5) to be:

$$C'' = R^{-1}CR = R_\beta^{-1}R_\alpha^{-1}CR_\alpha R_\beta \quad (6)$$

The induction tool can determine each of the elements of C" from magnetic field measurements. Coupling matrix element $C_{ij}''$ (i,j=x", y", z") is calculated from:

$$C_{ij}'' = R_i T_j / m_j \quad (7)$$

where $R_i T_j$ is the magnetic field measured by the ith receiver in response to the jth transmitter, and $m_j$ is the magnetic moment of the jth transmitter. If each of the transmitters has the same magnetic moment m, the coupling matrix can be expressed:

$$C'' = \frac{1}{m} \begin{bmatrix} Rx''Tx'' & Rx''Ty'' & Rx''Tz'' \\ Ry''Tx'' & Ry''Ty'' & Ry''Tz'' \\ Rz''Tx'' & Rz''Ty'' & Rz''Tz'' \end{bmatrix} \quad (8)$$

Note that due to changes in the formation as a function of depth, the coupling constants are also functions of depth. The strike angle can be determined directly from the measured signals. For example, it can be calculated by:

$$\beta = \tan^{-1}\left(\frac{TzRy}{TzRx}\right) \quad (9)$$

Knowing the strike angle, an inverse β rotation can be carried out. Based on equation (6), the coupling matrix becomes:

$$C'' = R_\beta C'' R_\beta^{-1} = R_\alpha^{-1} C R_\alpha \quad (10)$$

Accordingly, the signal measurements allow a straightforward determination of coupling matrix C" and strike angle β. The remaining angle is the dip angle α.

If the dip angle α were known, an inverse α rotation could be done to determine the coupling coefficients in the bed coordinate system. To determine the dip angle, we postulate a correction angle γ. When a rotation is performed about the y' axis, the coupling matrix becomes:

$$\tilde{C}(\gamma) = R_\gamma C'' R_{\gamma-1} = R_\gamma R_\alpha^{-1} C R_\alpha R_\gamma^{-1} \quad (11)$$

Equations (10) and (11) represent the virtual steering of the transmitters and receivers so that after the rotation, the transmitter and receivers are oriented in a direction that has no strike (β=0) and a dip angle of γ.

In studying the behavior of the coupling matrix $\overline{C}(\gamma)$, it has been found that the derivatives of certain elements can be used to identify the dip angle α. The first and second derivatives of RxTx(γ) as a function of depth z can usually be represented as $$C'_{xx}(\gamma) = \frac{\partial}{\partial z}[R_x T_x(\gamma)] = A\cos(2(\gamma - \alpha)) + B \quad (12)$$

$$C''_{xx}(\gamma) = \frac{\partial^2}{\partial z^2}[R_x T_x(\gamma)] = C\cos(2(\gamma - \alpha)) + D \quad (13)$$

where A, B, C and D are not functions of γ. The derivatives of RzTz(γ) can also be represented in the same form, albeit with different constants. This form does not apply when the sonde is straddling an interface between formation beds.

Figures 7, 8:
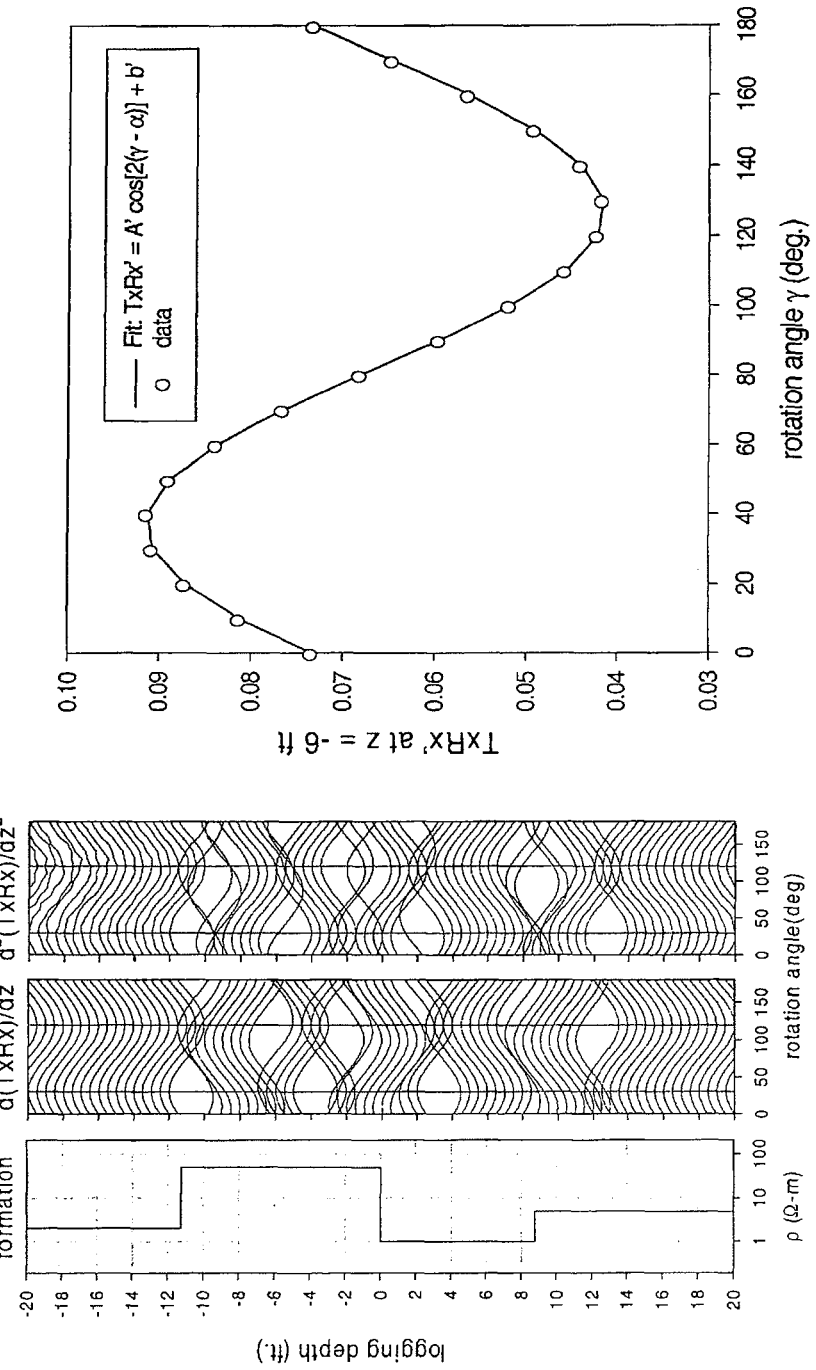
FIG. 7 shows a graph used to illustrate the shape of position derivatives of the magnetic coupling between a transmitter and a receiver.
FIG. 8 shows a minimum square error curve fit to the position derivative data points.

FIG. 7 shows a resistivity log of a model formation showing four beds of different resistivities. Adjacent to the resistivity log are plots of derivatives of RxTx(γ) confirming the form of equations (12) and (13). These are calculated using the response of a generic 3-coil triad sonde as it is logged in a dipping formation having a 30° dip and 40° strike. After all data has been acquired, at each logging point the sonde is virtually steered to arrive at the derivatives as a function of the rotation angle. The amplitudes of the derivatives at each logging position have been normalized and resealed according to depth for plotting purposes.

Because the form of the derivatives as a function of correction angle γ is known, the unknowns A, B and α, or C, D and α, can be determined when the derivatives are plotted as a function of the correction angle γ. Accordingly, coupling coefficient measurements may be taken, rotated to correct for the strike angle β, and rotated through a series of correction angles γ to obtain depth logs of RxTx(γ). The set of correction angles may be predetermined, e.g., 0°, 10°, 20°, 30°, . . . , 180°. The depth logs may then be differentiated with respect to depth to obtain the first and/or second derivatives.

The derivatives, if plotted as a function of correction angle γ, would have the form of equations (12), (13). The dip angle γ may consequently be calculated from the derivatives in several ways. For example, a simple least-squares curve fit to the data would work, as shown in FIG. 8. Another method with may be used involves a Hough transform. The use of the Hough transform is discussed by D. Tores, R. Strickland and M. Gianzero, "A New Approach to Determining Dip and Strike Using Borehole Images," SPWLA 31.sup.st Annual Logging Symposium, Jun. 24-27, 1990.

First the bias is removed. In equations (12) and (13), the constants B and D represent the bias. The bias can be largely eliminated by identifying the maximum and minimum values, and subtracting the average of the maximum and minimum values. Thus, pure cosine functions y'(γ) and y"(γ) may be found by:

$$y'(\gamma) = C'_{xx}(\gamma) - \tfrac{1}{2}[\max(C'_{xx}(\gamma)) - \min(C'_{xx}(\gamma))] = A\cos(2(\gamma-\alpha)) \quad (14)$$

$$y''(\gamma) = C''_{xx}(\gamma) - \tfrac{1}{2}[\max(C''_{xx}(\gamma)) - \min(C''_{xx}(\gamma))] = C\cos(2(\gamma-\alpha)) \quad (15)$$

where max and min denotes the maximum and minimum values in the interval 0°≤γ≤180°.

Equations (14) and (15) can be parameterized, i.e. one of the unknowns can be written as a function of the other unknown. For example:

$$A(\alpha) = \frac{y'(\gamma)}{\cos(2(\gamma - \alpha))} \quad (16)$$

$$C(\alpha) = \frac{y''(\gamma)}{\cos(2(\gamma - \alpha))} \quad (17)$$

Figure 9:
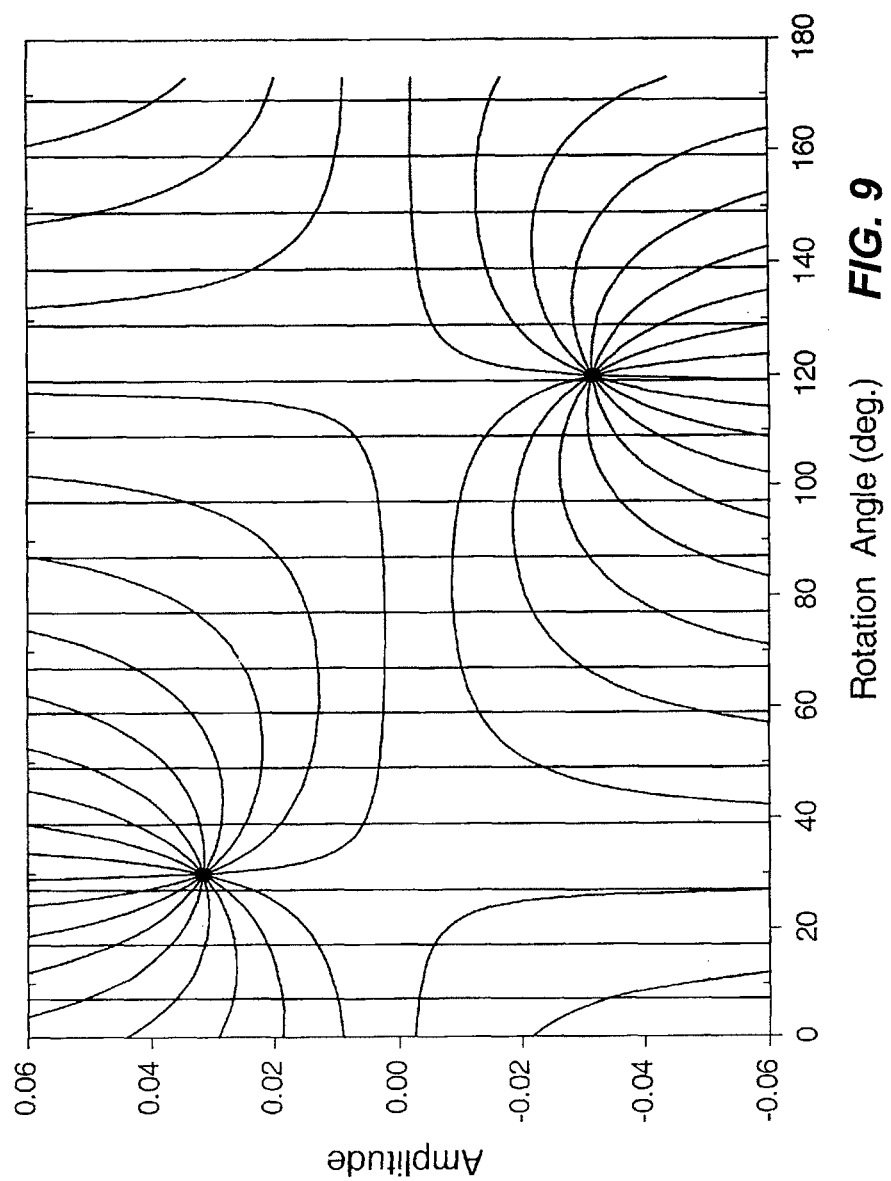
FIG. 9 shows a Hough transform of the data points using a parameterized cosine function.

In other words, given a known correction angle γ and a known corresponding value y'(γ) or y"(γ), the amplitude A or C is a function of the dip angle α. There may be multiple values of A or C for a given dip angle. Each combination of correction angle γ and corresponding value y'(γ) gives a different A(α) curve. FIG. 9 shows a set of A(α) curves for nine different values of correction angle γ. This is the Hough transform of measurement data satisfying equation (14).

One concern with using the Hough transform is the size of transform space that must be considered. As the range of the parameters is increased, the computational requirements are increased. It is expected that the range of the amplitude parameter can be limited to between twice the maximum value of y'(γ) and twice the minimum value of y'(γ), or between twice the maximums and minimums of y"(γ) when the second derivative is being used.

Of particular interest in FIG. 9 are the intersection points of the various curves. The two intersection points represent amplitude A and dip angle α values that are valid for each of the data points. Accordingly, they specify a curve that passes through each of the points, and the dip angle value has been determined for this depth. Although there are two solutions, they are equivalent, i.e. an inversion in the amplitude is equivalent to a 180° phase shift. Accordingly, the solution with α>90° may be ignored. The process is repeated for each logging depth to obtain a log of dip angle versus depth.

The intersections may be found by quantizing the parameter space into bins, and counting the number of curves that pass through each bin. The bins with the highest number of curves contain the intersections. More detail on the use of Hough transforms may be found in many standard reference texts.

Figure 10:
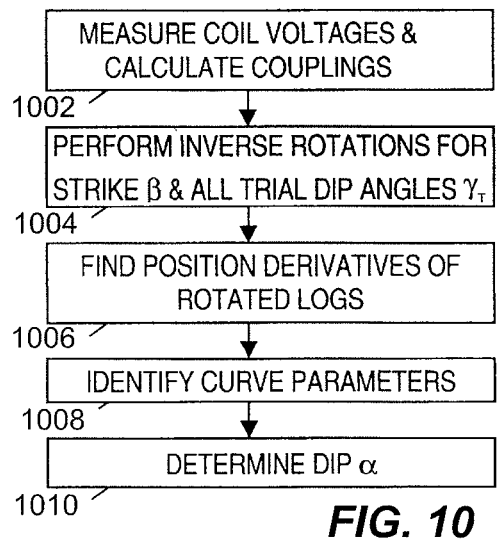
FIG. 10 shows a flow diagram for the disclosed method of determining dip angles in a dipping earth formation.

FIG. 10 shows a flowchart of this method. In block 1002, the transmitters are sequentially fired, the receiver signals are measured, and the coupling matrix elements in equation (8) are calculated. In block 1004, the inverse β-rotation is performed on the coupling matrix. A set of dip-correction γ-rotations is then applied to the matrix to determine a set of terms (either RxTx(γ) or RzTz(γ)) as a function of logging tool position. In block 1006, the selected set of terms is differentiated with respect to position to determine either the first or second derivative. In block 1008 a curve parameter identification technique is performed on the set of differentiated terms. This technique may be curve fitting, a Hough transform, or some other technique. In block 1010, the identified curve parameters are used to calculate the dip angle α. A dip angle is determined for each tool position in the borehole.

Figures 11, 12, 13:
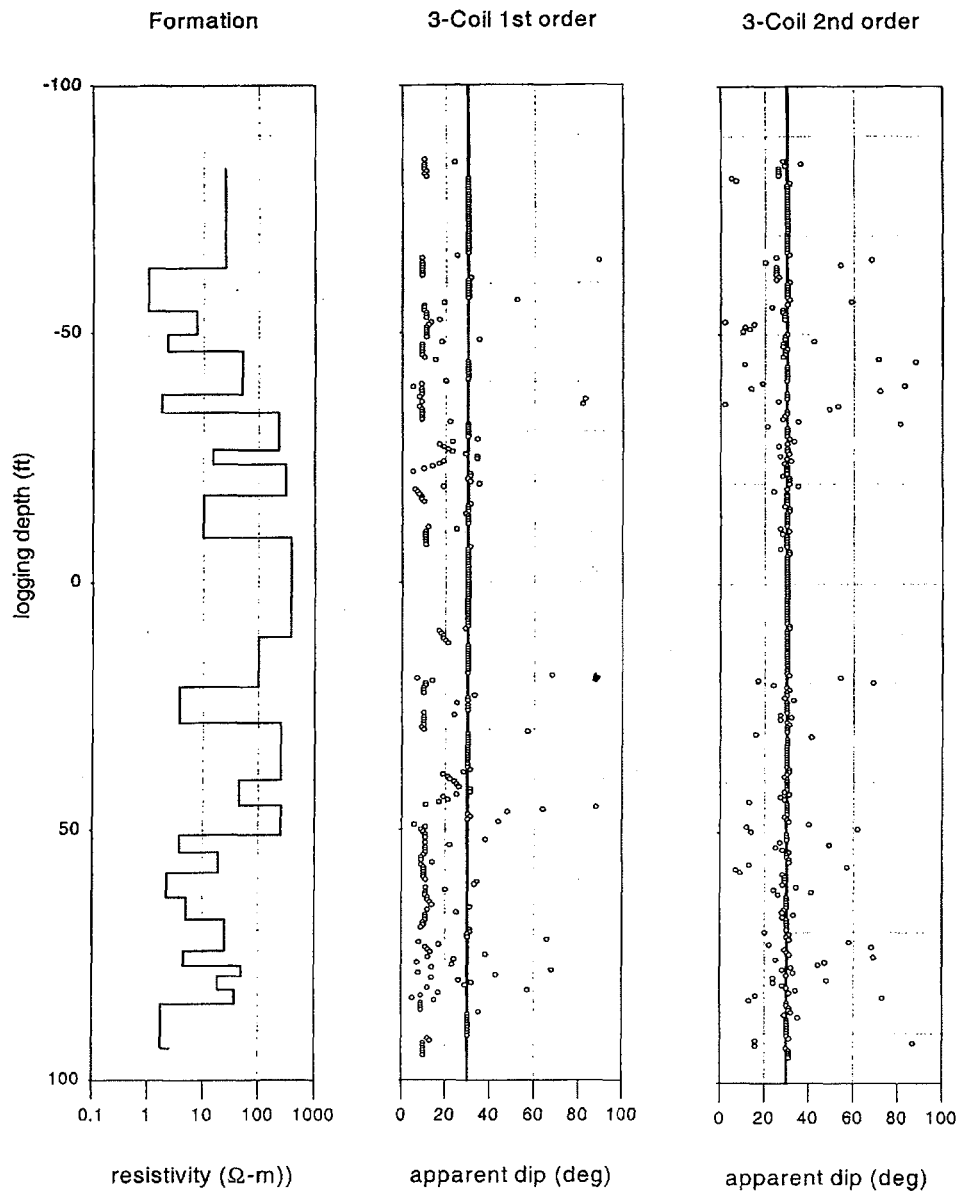
FIG. 11 shows a resistivity log of a model bedded formation.
FIG. 12 shows a dipmeter log calculated from the first derivative of the coupling.
FIG. 13 shows a dipmeter log calculated from the second derivative of the coupling.
Figures 14, 15:
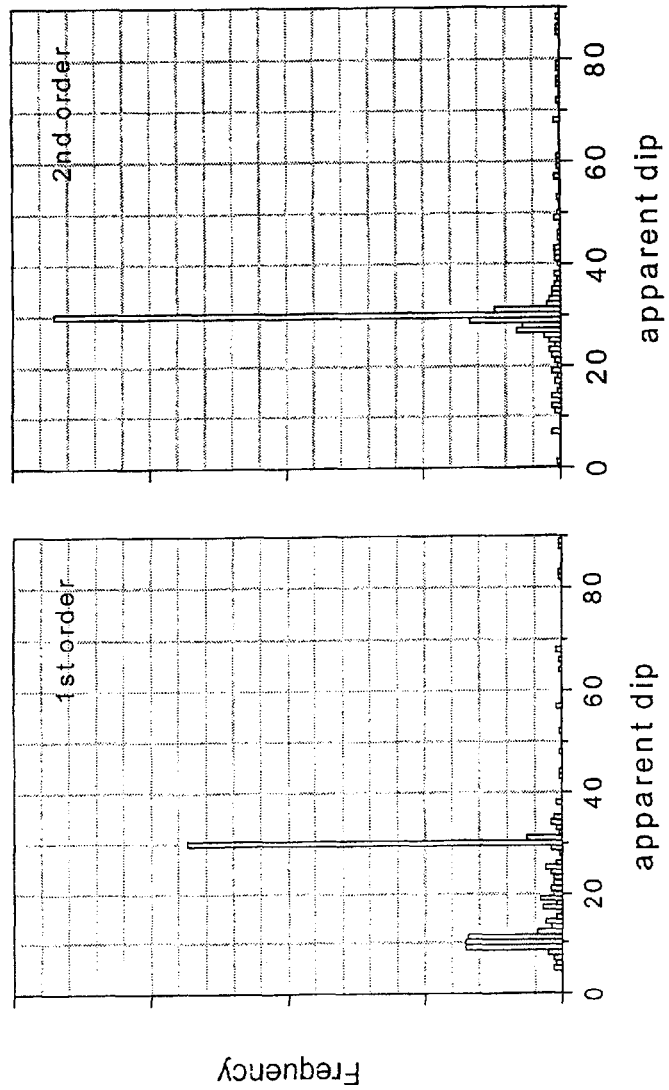
FIG. 14 shows a histogram of the dipmeter log of FIG. 12.
FIG. 15 shows a histogram of the dipmeter log of FIG. 13.

A comparison of the results of using the first and second derivatives to calculate dip angle is now made. FIG. 11 shows a resistivity log of a model formation. The model formation has beds that dip at 30° across the borehole. FIG. 12 shows the dip angle calculated for the model formation using the first derivative. In the neighborhood of bed interfaces between low-resistivity beds, the calculated angle deviates downward from the true dip, but is generally accurate for thicker beds. FIG. 13 shows the dip angle calculated for the same formation using the second derivative. While there is some scatter in the neighborhood of thin beds, the dip calculation is generally quite accurate. FIG. 14 shows a histogram of the dip angle results in FIG. 12, and FIG. 15 shows a histogram of the dip angle results in FIG. 13. The first derivative method shows a false peak at 10° as well as a peak at the true dip of 30°. In the second derivative, the false peak is absent.

The disclosed method can be utilized to determine regional dip and strike information in wells where conditions are not favorable for the operation of traditional resistivity wireline dipmeters or resistivity imaging tools. Such conditions include, but are not limited to, wells drilled with oil based mud and wells with highly rugose wellbores. It is noted that the disclosed method can be used for both wireline operations and LWD operations. In LWD operations, the method, in addition to determining regional dip and strike, can be further used to facilitate geosteering in highly deviated and/or horizontal wells.

Figure 16:
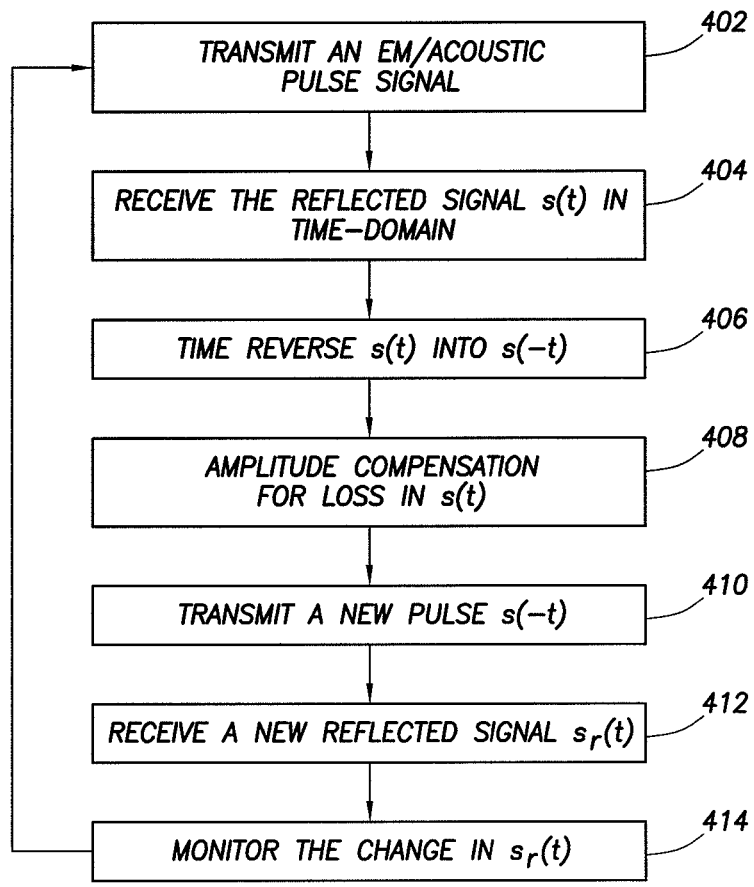
FIG. 16 depicts the procedure for time reversal for boundary detection ahead of a bit in accordance with an exemplary embodiment of the present invention.

FIG. 16 depicts the procedure for time reversal for boundary detection ahead of a bit in accordance with an exemplary embodiment of the present invention. The time reversal procedure set forth in FIG. 16 is equally applicable to electromagnetic waves and acoustic waves.

First, at step 402 a short electromagnetic pulse (X) is emitted from the transceiver array 304. As discussed in detail below, the method steps disclosed herein are equally applicable to instances where an acoustic wave is initially generated by the transceiver array instead of an electromagnetic wave. This pulse is then reflected by the bed boundaries ahead of the bit as a pulse s(t) in the time domain. The transceiver array 304 detects this first reflected signal s(t) at step 404. However, due to the dispersion of the medium, the detected signal s(t) is typically spread out in the time domain.

In accordance with an exemplary embodiment of the present disclosure, the detected signal s(t) is time reversed as s(−t) at step 406. Additionally, because a portion of the initially generated signal (X) is lost to the formation, at step 408, in one embodiment, the amplitude of the time reversed signal s(−t) may be adjusted to compensated for that loss. This time reversed signal with the adjusted amplitude is then retransmitted as a new pulse s(−t) at step 410. The signal s(−t) is then reflected again by the medium as a new reflected pulse $s_r(t)$ which is detected by the transceiver array 304 as a second reflected signal at step 412. The second reflect signal $s_r(t)$ is naturally focused to give a significant improved sharpness in the time domain. At step 414, the change in $s_r(t)$ from a previously obtained value is monitored. The process then returns to step 402 and the same steps are repeated to monitor the changes in $s_r(t)$ over time, as the drill bit progresses through the formation.

In order to monitor the change in the received time reversed signal $s_r(t)$ (hereinafter, "measured signal" or "measured response"), one can compare the signal with known, precalculated bed-transmitter separation and boundary property information. This can be carried out by assuming a known distance to bed boundary and a known resistivity contrast between the upcoming bed of interest and the formation surrounding the drill bit (i.e. current bed). The expected time reversed response of the tool may then be calculated. Next, the calculated response may be compared with the measured response. This comparison may be iteratively carried out continually while performing drilling operations. In one exemplary embodiment, this iterative process may continue until the difference between the measured response and the calculated response is equal to or less than a preset, threshold, acceptable error value. Based on this comparison of the calculated response with the measured response, the assumed values for the distance to the bed boundary and the resistivity contrast between the current bed and an upcoming bed may be modified. As the drilling operations continue and more measured data goes into the iterative process, information of interest such as, for example, distance from an upcoming bed and its properties (e.g., resistance for electromagnetic waves, acoustic impedance for acoustic waves) are further refined.

Figure 17A:
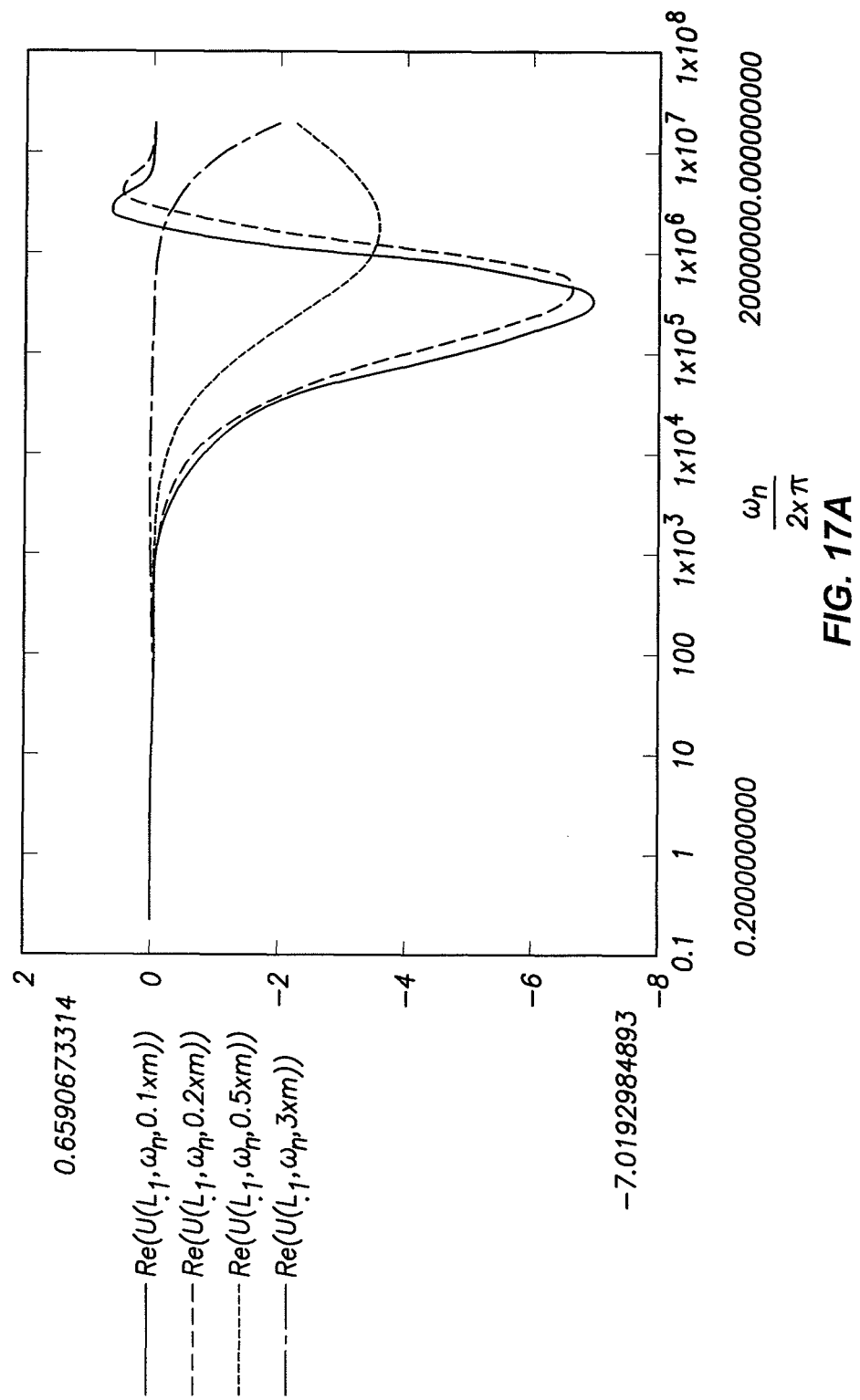
FIGS. 17A and 17B depict the calculated real and imaginary part, respectively, of the second reflected signal in the frequency domain, as a function of frequency for several transmitter-bed distances.
Figure 17B:
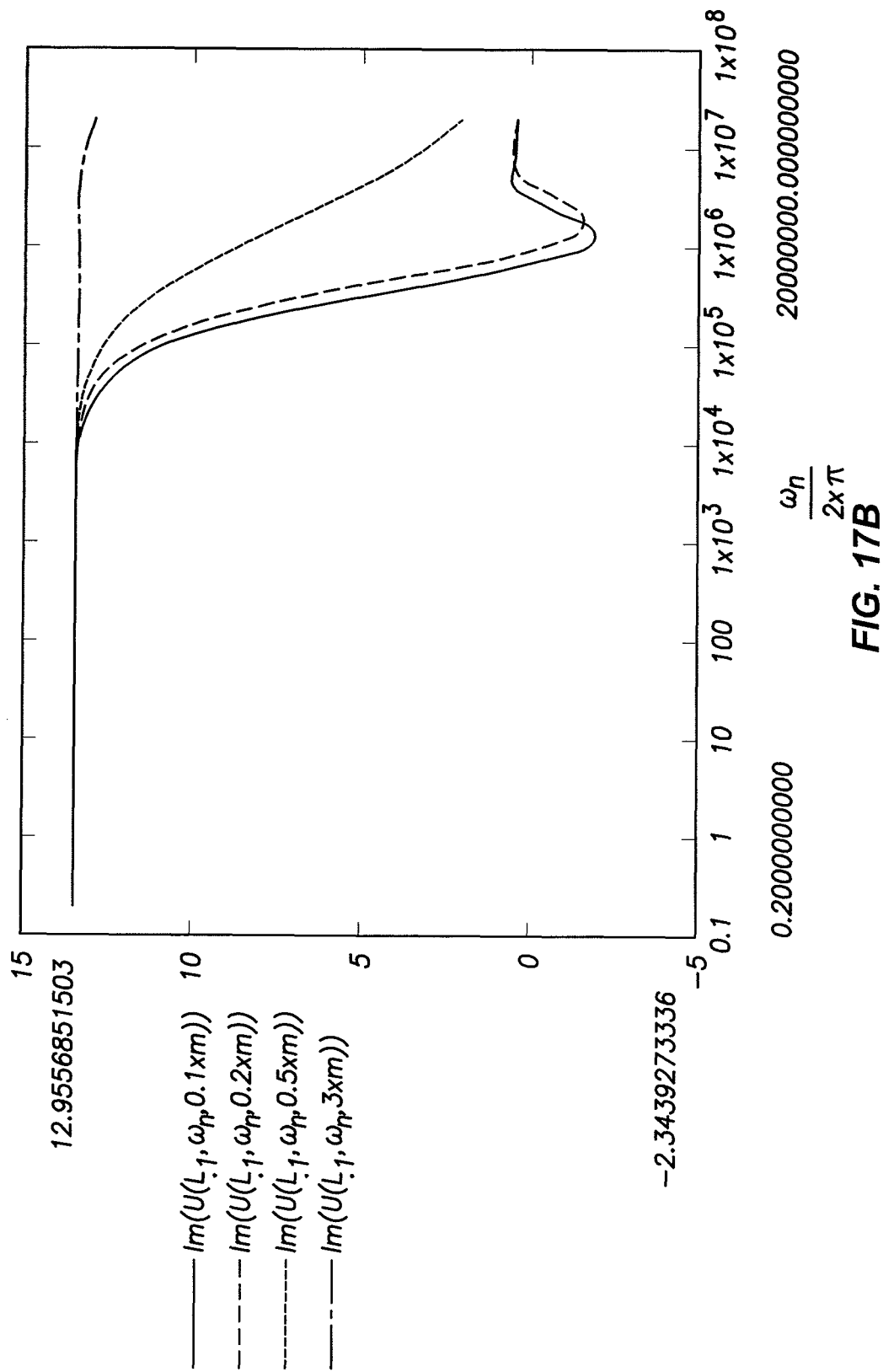

In FIG. 17, the response to an approaching bed with resistivity contrast is theoretically calculated in the frequency domain. Specifically, FIGS. 17A and 17B depict the calculated real and imaginary part, respectively, of the second reflect signal $s_r(t)$ in the frequency domain, as a function of frequency for several transmitter-bed distances. In the exemplary embodiment depicted in FIGS. 17A and 17B, the formation 304 has a first resistivity ($\rho_1$) of 100 ohm·m and a second resistivity ($\rho_2$) of 0.1 ohm·m. As would be appreciated by those of ordinary skill in the art, with the benefit of this disclosure, a Fourier transformation of these signals may be used to produce the time domain impulse response of the formation.

Figure 18:
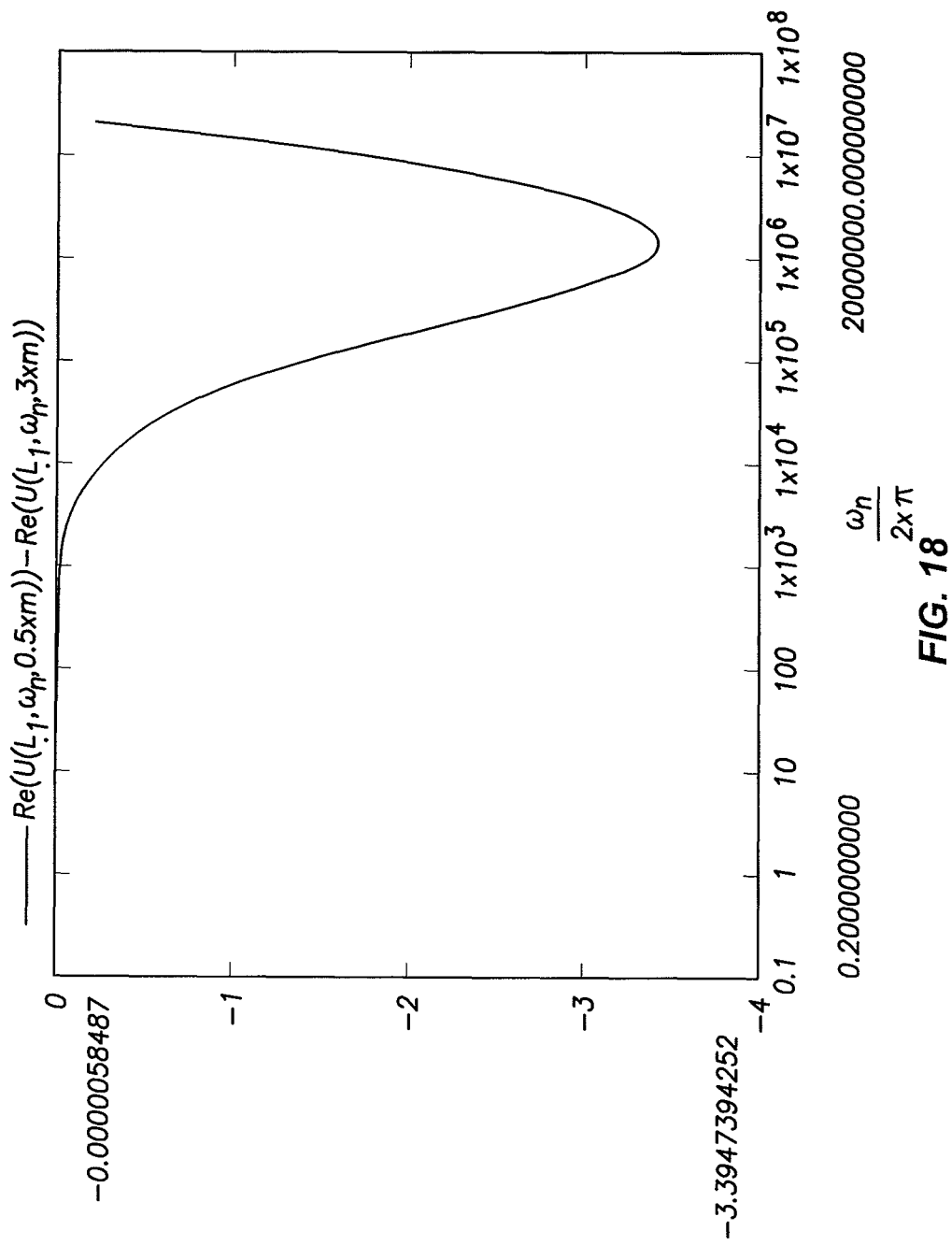
FIG. 18 depicts the difference between the real part of the second reflected signal (Z) at a distance of 3 [m] to the bed and at a distance of 0.5 [m] to the bed in the frequency domain.

As would be appreciated by those of ordinary skill in the art, with the benefit of this disclosure, there may be discernible differences in the detected signal at different transmitter-to-bed distances. For instance, FIG. 18 depicts the difference between the real part of the second reflected signal $s_r(t)$ at a distance of 3 [m] to the bed and at a distance of 0.5 [m] to the bed in the frequency domain.

Figure 19:
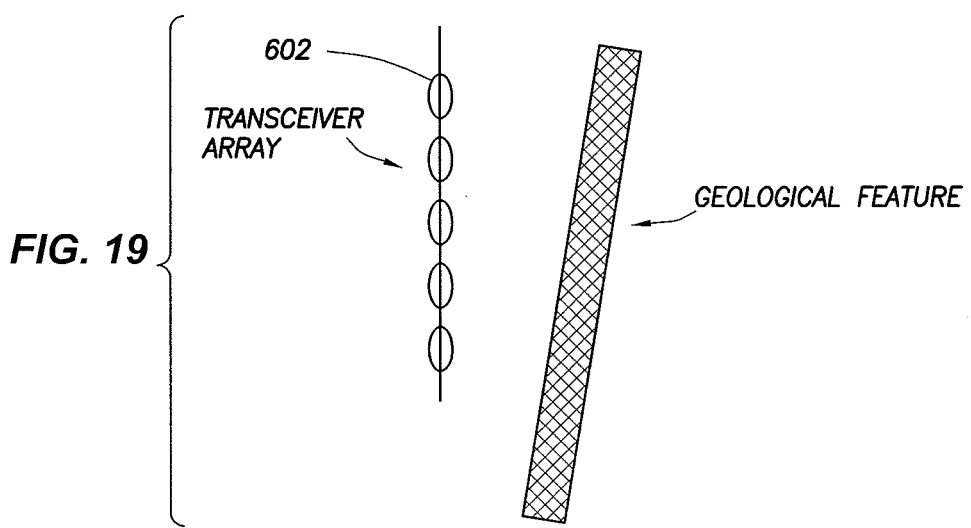
FIG. 19 depicts a schematic view of a formation bed configuration ahead of the bit where the transceiver array is positioned at an angle to a geological formation.

As would be appreciated by those of ordinary skill in the art, with the benefit of this disclosure, the methods and systems disclosed herein are not limited to transceiver arrays with an orientation perpendicular to the tool string axis as shown in FIG. 3. For instance, FIG. 19 depicts an exemplary embodiment where the transceiver array 602 is positioned at an angle to a geological feature 604. In this embodiment, the methods and systems disclosed herein may be utilized to detect sideway boundaries. The ability to use the methods and systems disclosed herein with sensitivity to detect sideway boundaries is of particular importance when guiding a drill bit in a horizontal well bore.

Further, although the present methods are disclosed in conjunction with electromagnetic waveforms, the principles disclosed herein are equally applicable to other wave forms such as, for example, acoustic waves. For instance, the acoustic wave equation obeys the same time reversal symmetry. Specifically, the acoustic wave equation may be used to describe the scalar pressure field p(r, t) as:

$$\nabla^2 p(r, t) - \frac{1}{c^2} \frac{\partial^2}{\partial t^2} p(r, t) = 0$$

where p is the acoustic pressure (the local deviation from the ambient pressure) and c is the speed of sound. Accordingly, the transceiver may generate and receive acoustic waves instead of electromagnetic waves in accordance with an embodiment of the present invention. As would be appreciated by those of ordinary skill in the art, with the benefit of this disclosure, because the earth formation is less dispersive to acoustic waves than electromagnetic waves, the use of acoustic waves instead of electromagnetic waves may be desirable in certain applications. For instance, the resistivity contrast may be small between a hydrocarbon bearing zone and a fresh water bearing zone. In contrast, the difference in acoustic impedance between the two zones may be higher and therefore, easier to detect.

As would be appreciated by those of ordinary skill in the art, with the benefit of this disclosure, when signal loss in the medium is non-negligible, time reversal may break down. However, there are established techniques that can be used to compensate for the attenuation in both the received signal s(t) and the retransmitted time-reversed signal s(−t). One such technique is disclosed in "Frequency dispersion compensation in time reversal techniques for UWB electromagnetic waves" by Yavuz et al., published in IEEE Geosience and Remote Sensing Letters, v2, no. 2, pp. 233-237, 2005. Additionally, one may take advantage of the phase information. Specifically, operation of an electromagnetic wave propagating LWD tool for measuring resistivity of formation surrounding a wellbore is based on measuring the signal attenuation and phase shift between a transmitter and receiver. Similarly, information contained in the phase portion of the time reversed signal can be used in combination with its amplitude to refine the measurement.

As would be appreciated by those of ordinary skill in the art, with the benefit of this disclosure, in one exemplary embodiment, the methods and systems disclosed herein may be implemented using an information handling system. In one embodiment, the transceiver array may be communicatively coupled to an information handling system through a wired or wireless network. Operation of such systems are well known to those of ordinary skill in the art and will therefore not be discussed in detail herein. The information handling system may control generation of signals by the transceiver array and/or process the signals detected to analyze the formation ahead of the bit. Specifically, software including instructions in accordance with the methods disclosed herein may be stored in computer-readable media of an information handling system. The information handling system may then use those instructions to carry out the methods disclosed herein. In one exemplary embodiment, the information handling system may store the values of the measured signal in each iteration as it carries out the methods disclosed herein. In one embodiment, the information handling system may include a user interface that may provide information relating to formation properties to a user in real time.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of analyzing a subterranean formation comprising:
   transmitting a first signal from a transmitter to the formation;
   receiving with a receiver a second signal from the formation;
      wherein the second signal is a reflection of the first signal from the formation;
   generating a third signal at an information handling system communicatively coupled to the transmitter and the receiver,
      wherein the third signal is the second signal reversed in time;
   transmitting the third signal from the transmitter to the formation;
   receiving with the receiver a fourth signal from the formation;
      wherein the fourth signal is a reflection of the third signal from the formation;
   monitoring the fourth signal.

2. The method of claim 1, wherein generating the third signal further comprises compensating for loss in amplitude of the second signal.

3. The method of claim 1, wherein at least one of the first signal, the second signal, the third signal and the fourth signal is selected from a group consisting of an electromagnetic wave and an acoustic wave.

4. The method of claim 1, wherein the first signal is a pulse signal.

5. The method of claim 1, further comprising:
   assuming a distance to a bed boundary;
   assuming a resistivity contrast between an upcoming bed and a current bed; and
   determining a calculated signal using the assumed distance to the bed boundary and the assumed resistivity contrast.

6. The method of claim 5, further comprising:
   comparing the fourth signal with the calculated signal;
   adjusting at least one of the assumed distance to the bed boundary and the assumed resistivity contrast between the upcoming bed and the current bed based, at least in part, on the comparison of the fourth signal and the calculated signal.

7. The method of claim 1, further comprising:
   assuming a distance to a bed boundary;
   assuming an acoustic impedance contrast between an upcoming bed and a current bed; and
   determining a calculated signal using the assumed distance to the bed boundary and the assumed acoustic impedance contrast.

8. The method of claim 7, further comprising:
   comparing the fourth signal with the calculated signal;
   adjusting at least one of the assumed distance to the bed boundary and the assumed acoustic impedance contrast between the upcoming bed and the current bed based, at least in part, on the comparison of the fourth signal and the calculated signal.

9. A system for analyzing formation properties comprising:
   an information handling system;
   a transmitter placed in a formation and communicatively coupled to the information handling system;
   a receiver placed in the formation and communicatively coupled to the information handling system;
      wherein the transmitter transmits a first signal to a subterranean formation in response to instructions from the information handling system;

wherein the receiver receives a second signal from the formation, the second signal being a reflection of the first signal;

wherein the receiver communicates the second signal to the information handling system;

wherein the transmitter transmits a third signal to the formation in response to instructions from the information handling system, the third signal being the second signal reversed in time;

wherein the receiver receives a fourth signal from the formation, the fourth signal being a reflection of the third signal;

wherein the information handling system uses the fourth signal to determine at least one of a property of an upcoming bed and a distance to a bed boundary.

10. The system of claim 9, wherein the transmitter and the receiver are part of a transceiver.

11. The system of claim 10, wherein the transceiver is selected from a group consisting of a coaxial transceiver, a tilted transceiver, a horizontal transceiver and a virtually steerable transceiver.

12. The system of claim 9, wherein at least one of the first signal, the second signal, the third signal and the fourth signal is selected from a group consisting of an electromagnetic wave and an acoustic wave.

13. A method for anticipating an upcoming bed when performing subterranean operations in a formation, comprising:

generating at an information handling system a first signal into the formation;

receiving a reflection of the first signal as a second signal at the information handling system;

generating at the information handling system a third signal into the formation, wherein the third signal is the second signal reversed in time;

receiving at the information handling system a reflection of the third signal as a fourth signal;

determining a calculated signal using assumed formation properties;

comparing the fourth signal with the calculated signal;

modifying the assumed formation properties if the difference between the fourth signal and the calculated signal exceeds a threshold value.

14. The method of claim 13, wherein at least one of the first signal, the second signal, the third signal and the fourth signal is selected from a group consisting of an electromagnetic wave and an acoustic wave.

15. The method of claim 13, wherein the assumed formation properties comprise at least one of a distance to a boundary between a current bed and an upcoming bed, a resistivity contrast between the upcoming bed and the current bed, and an acoustic impedance contrast between the upcoming bed and the current bed.

16. The method of claim 13, wherein generating the third signal further comprises compensating for loss in amplitude of the second signal.

17. The method of claim 13, wherein an information handling system at least one of determines a calculated signal using assumed formation properties, compares the fourth signal with the calculated signal, and modifies the assumed formation properties if the difference between the fourth signal and the calculated signal exceeds a threshold value.

18. The method of claim 13, further comprising storing the fourth signal in a computer readable media.

19. The method of claim 13, wherein a transceiver generates at least one of the first signal and the third signal and receives at least one of the second signal and the fourth signal.

20. The method of claim 19, wherein the transceiver is selected from a group consisting of a coaxial transceiver, a tilted transceiver, a horizontal transceiver and a virtually steerable transceiver.

* * * * *